(12) United States Patent
Taga et al.

(10) Patent No.: US 6,377,375 B1
(45) Date of Patent: Apr. 23, 2002

(54) OPTICAL WAVELENGTH DIVISION MULTIPLEXED SIGNAL AMPLIFYING REPEATER AND OPTICAL COMMUNICATION TRANSMISSION LINE WITH VERY LARGE CAPACITY

(75) Inventors: Hidenori Taga, Sakado; Shu Yamamoto, Shiki, both of (JP)

(73) Assignee: KDD Corporation, Toyko (JP)

( * ) Notice: Subject to any disclaimer, the term of this patent is extended or adjusted under 35 U.S.C. 154(b) by 0 days.

(21) Appl. No.: 09/231,893

(22) Filed: Jan. 14, 1999

(30) Foreign Application Priority Data

Jan. 19, 1998 (JP) .......................... 10-008010

(51) Int. Cl.[7] .............................. H04J 14/02
(52) U.S. Cl. ..................... 359/134; 359/127
(58) Field of Search .................. 359/124, 127, 359/160, 177, 345, 349, 134

(56) References Cited

U.S. PATENT DOCUMENTS 5,361,319 A * 11/1994 Antos et al. ............... 385/123
5,546,483 A * 8/1996 Inoue et al. ................ 385/14
5,915,052 A * 6/1999 Ball ............................ 385/24
5,978,130 A * 11/1999 Fee et al. .................. 359/341
6,052,393 A * 4/2000 Islam ............................ 372/6
6,205,268 B1 * 3/2001 Chraplyvy et al. ......... 385/24

OTHER PUBLICATIONS 2.6 Terabit/s WDM Transmission Experiment Using Optical Duobinary Coding, by Y. Yano, et al. and, Opto–Electronics Research Laboratories, NEC Corporation, Japan. 22nd European Conference on Optical Communication—ECOC '96, Oslo, (pp. 5.3 –5.6).

* cited by examiner

Primary Examiner—Leslie Pascal
Assistant Examiner—Dalzid Singh
(74) Attorney, Agent, or Firm—Olson & Hierl, Ltd.

(57) ABSTRACT

An optical wavelength division multiplexed signal amplifying repeater capable of doubling the number of wavelength division multiplexed signals that can be transmitted is disclosed. Optical signals of both 1.3 $\mu$m band and 1.55 $\mu$m band in the entered optical wavelength division multiplexed signals are amplified, while pumping lights capable of causing Raman amplification in the 1.3 $\mu$m band are coupled with the optical wavelength division multiplexed signals so as to cause the Raman amplification for the optical signals of the 1.3 $\mu$m band, such that a difference between the loss in the 1.3 $\mu$m band and the loss in the 1.55 $\mu$m band due to the optical fibers are compensated. An optical communication transmission line using such repeaters is also disclosed.

24 Claims, 12 Drawing Sheets

WAVELENGTH DIVISION
MULTIPLEXED SIGNALS
OF 1.3 μm BAND

WAVELENGTH DIVISION
MULTIPLEXED SIGNALS
OF 1.55 μm BAND

MEAN ZERO DISPERSION
WAVELENGTH OF
OPTICAL FIBER

OPTICAL WAVELENGTH DIVISION MULTIPLEXED SIGNAL AMPLIFYING REPEATER AND OPTICAL COMMUNICATION TRANSMISSION LINE WITH VERY LARGE CAPACITY

BACKGROUND OF THE INVENTION

1. Field of the Invention

The present invention relates to a wavelength division multiplexed signal amplifying repeater for amplifying and relaying optical wavelength division multiplexed signals and an optical communication transmission line using such repeaters.

2. Description of the Background Art

An optical fiber transmission line using optical amplifiers has a good affinity with the optical wavelength division multiplexed communications as the optical amplifiers can amplify optical wavelength division multiplexed signals collectively, and there has been a report of a long distance transmission experiment for over 9000 km.

However, the erbium doped optical fiber amplifier (abbreviated hereafter as EDFA) that is the optical amplifier used in the 1.55 $\mu$m band that is the wavelength band for the long distance optical communications has the amplification bandwidth of about 40 nm from 1530 nm to 1570 nm, so that the upper bound of the number of wavelengths that can be wavelength division multiplexed is about 50 wavelengths for the wavelength division multiplexed signals with a wavelength separation of 100 GHz that are standardized by the ITU-T (International Telecommunications Union-Telecommunication sector).

Recently, there has been a report of a gain shifted EDFA in which the gain bandwidth of EDFA is shifted toward the long wavelength side. This gain shifted EDFA has the amplification bandwidth of about 40 nm from 1580 nm to 1620 nm, and there has also been a report of an optical amplifier in which the gain bandwidth is almost doubled by combining this gain shifted EDFA with the usual EDFA. However, even in such a case, the upper bound of the number of wavelengths that can be wavelength division multiplexed is about 100 wavelengths.

The transmission capacity required in the future optical fiber communications is expected to be a very large capacity of several Tbit/s. At a research level, there has already been a report of a transmission of as many wavelength division multiplexed signals as 2.6 Tbit/s in total (Y. Yano, et al., "2.6 Terabit/s WDM transmission experiment using optical duo-binary coding", ECOC'96, Paper ThB.3.3, 1996).

In order to realize such a transmission capacity using SDH (Synchronous Digital Hierarchy) standard bit rate of STM-64 (10 Gbit/s) as a capacity per one wavelength, it is expected that the number of wavelengths that can be wavelength division multiplexed at a level of 100 wavelengths is insufficient and at least 200 wavelengths or more will be necessary.

As described above, there has been no technique for constructing an optical communication transmission line with a very large capacity of several Tbit/s in accordance with the international standards such as ITU-T standard and SDH standard.

SUMMARY OF THE INVENTION

It is therefore an object of the present invention to provide an optical wavelength division multiplexed signal amplifying repeater capable of doubling the number of wavelength division multiplexed signals that can be transmitted so that it becomes possible to realize an optical communication transmission line with a very large capacity of several Tbit/s.

It is another object of the present invention to provide an optical communication transmission line using such repeaters.

According to one aspect of the present invention there is provided an optical wavelength division multiplexed signal amplifying repeater, comprising: an optical amplification unit for amplifying optical signals of both 1.3 $\mu$m band and 1.55 $\mu$m band in optical wavelength division multiplexed signals entered from an input optical fiber; a pumping light source for providing pumping lights capable of causing Raman amplification in the 1.3 $\mu$m band; and an optical coupling unit for coupling the pumping lights from the pumping light source with the optical wavelength division multiplexed signals so as to cause the Raman amplification for the optical signals of the 1.3 $\mu$m band, such that the optical wavelength division multiplexed signals in which the optical signals of the 1.3 $\mu$m band and the 1.55 $\mu$m band are amplified by the optical amplification unit and the Raman amplification is caused for the optical signals of the 1.3 $\mu$m band by the pumping lights that are coupled with the wavelength division multiplexed signals by the optical coupling unit are outputted to an output optical fiber.

According to another aspect of the present invention there is provided an optical communication transmission line, comprising: a plurality of optical wavelength division multiplexed signal amplifying repeaters, each having: an optical amplification unit for amplifying optical signals of both 1.3 $\mu$m band and 1.55 $\mu$m band in optical wavelength division multiplexed signals entered from an input optical fiber; a pumping light source for providing pumping lights capable of causing Raman amplification in the 1.3 $\mu$m band; and an optical coupling unit for coupling the pumping lights from the pumping light source with the optical wavelength division multiplexed signals so as to cause the Raman amplification for the optical signals of the 1.3 $\mu$m band, such that the optical wavelength division multiplexed signals in which the optical signals of the 1.3 $\mu$m band and the 1.55 $\mu$m band are amplified by the optical amplification unit and the Raman amplification is caused for the optical signals of the 1.3 $\mu$m band by the pumping lights that are coupled with the wavelength division multiplexed signals by the optical coupling unit are outputted to an output optical fiber; and optical fibers connecting the optical wavelength division multiplexed signal amplifying repeaters in series.

Other features and advantages of the present invention will become apparent from the following description taken in conjunction with the accompanying drawings.

DETAILED DESCRIPTION OF THE PREFERRED EMBODIMENTS

Referring now to FIG. 1 to FIG. 17, several embodiments of an optical wavelength division multiplexed signal amplifying repeater and an optical communication transmission line according to the present invention will be described.

Figure 1:
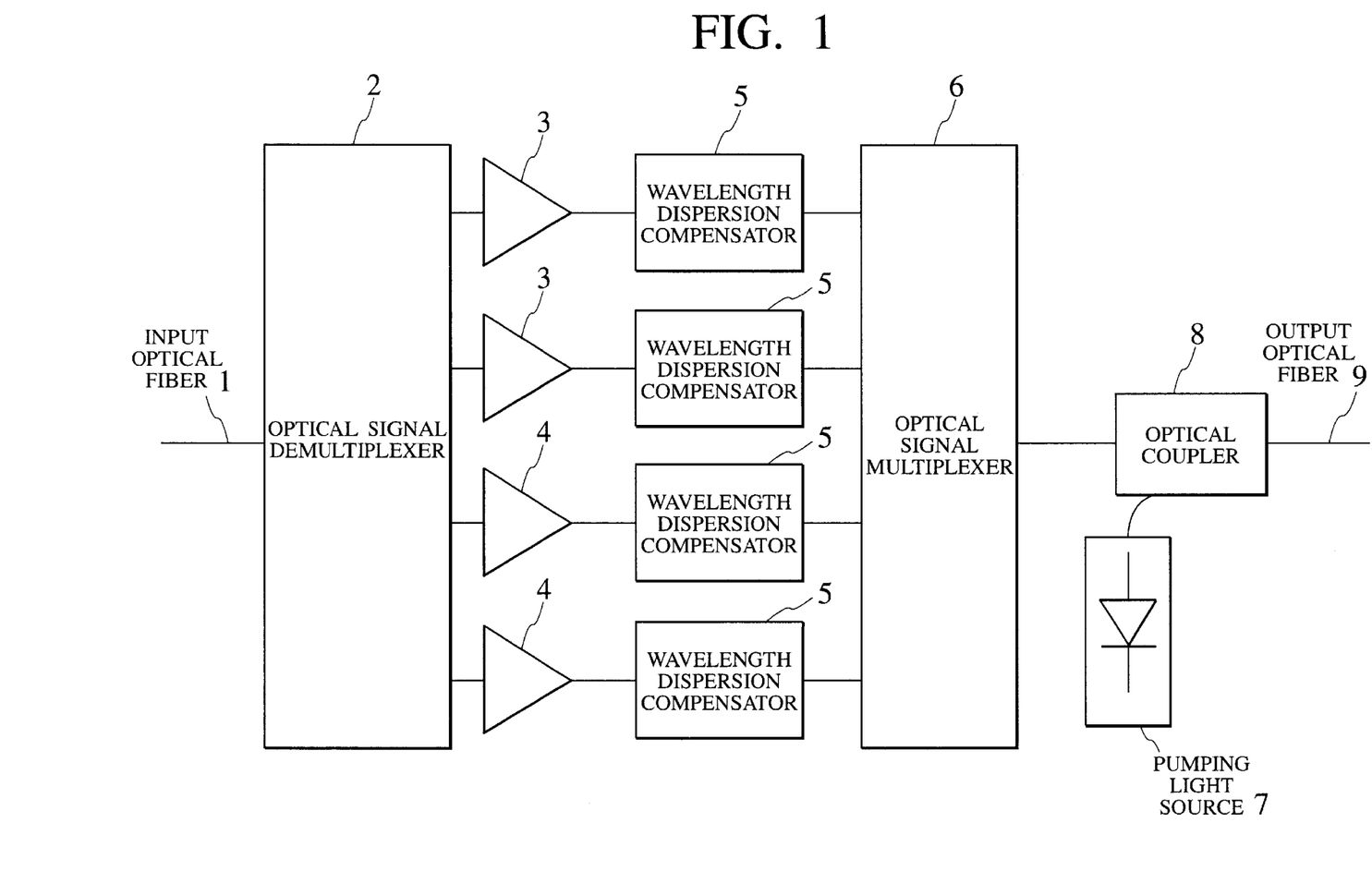
FIG. 1 is a block diagram showing a configuration of an optical wavelength division multiplexed signal amplifying repeater according to the first embodiment of the present invention.

FIG. 1 shows an exemplary configuration of an optical wavelength division multiplexed signal amplifying repeater according to the first embodiment of the present invention. This optical wavelength division multiplexed signal amplifying repeater has two 1.55 μm band optical amplifiers 3 for amplifying optical signals of the 1.55 μm band which are similar to those currently used for the log distance transmission and two 1.3 μm band optical amplifiers 4 for amplifying optical signals of the 1.3 μm band, so as to be able to expand the amplification bandwidth by amplifying optical signals of wavelengths in the 1.55 μm band and the 1.3 μm band.

The optical wavelength division multiplexed signals entered from an input optical fiber 1 are separated into optical signals of wavelengths in respective amplification bandwidths of the optical amplifiers 3 and 4 by an optical signal demultiplexer 2, and the optical signals of the 1.55 μm band are entered into the 1.55 μm band optical amplifiers 3 and amplified there while the optical signals of the 1.3 μm band are entered in to the 1.3 μm band optical amplifiers 4 and amplified there.

The optical signals of the 1.55 μm band and the 1.3 μm band that are amplified by the optical amplifiers 3 and 4 respectively are then entered into respective wavelength dispersion compensators 5 where the wavelength dispersion of the transmission line is compensated, and then entered into an optical signal multiplexer 6. This optical signal multiplexer 6 multiplexes the optical signals of the 1.55 μm band and the optical signals of the 1.3 μm band to form optical wavelength division multiplexed signals again, and enters them into an optical coupler 8.

The optical coupler 8 couples the optical wavelength division multiplexed signals from the optical signal multiplexer 6 with a pumping light of a wavelength in a vicinity of 1.2 μm that is outputted from a pumping light source 7 for 1.3 μm band Raman amplification.

The pumping light source 7 for 1.3 μm band Raman amplification has an effect of causing the Raman amplification at the 1.3 μm band, such that the optical signals of the 1.3 μm band among the optical wavelength division multiplexed signals that are coupled with the pumping light at the optical coupler 8 will be given the Raman gain by the pumping light from the pumping light source 7, so as to compensate the loss of the optical signals of the 1.3 μm band in the optical fiber 1 and make the power of the optical signals of the 1.3 μm band in the optical fiber transmission line nearly equal to that of the optical signals of the 1.55 μm band. The resulting optical wavelength division multiplexed signals are then outputted from an output optical fiber 9.

Figure 2:
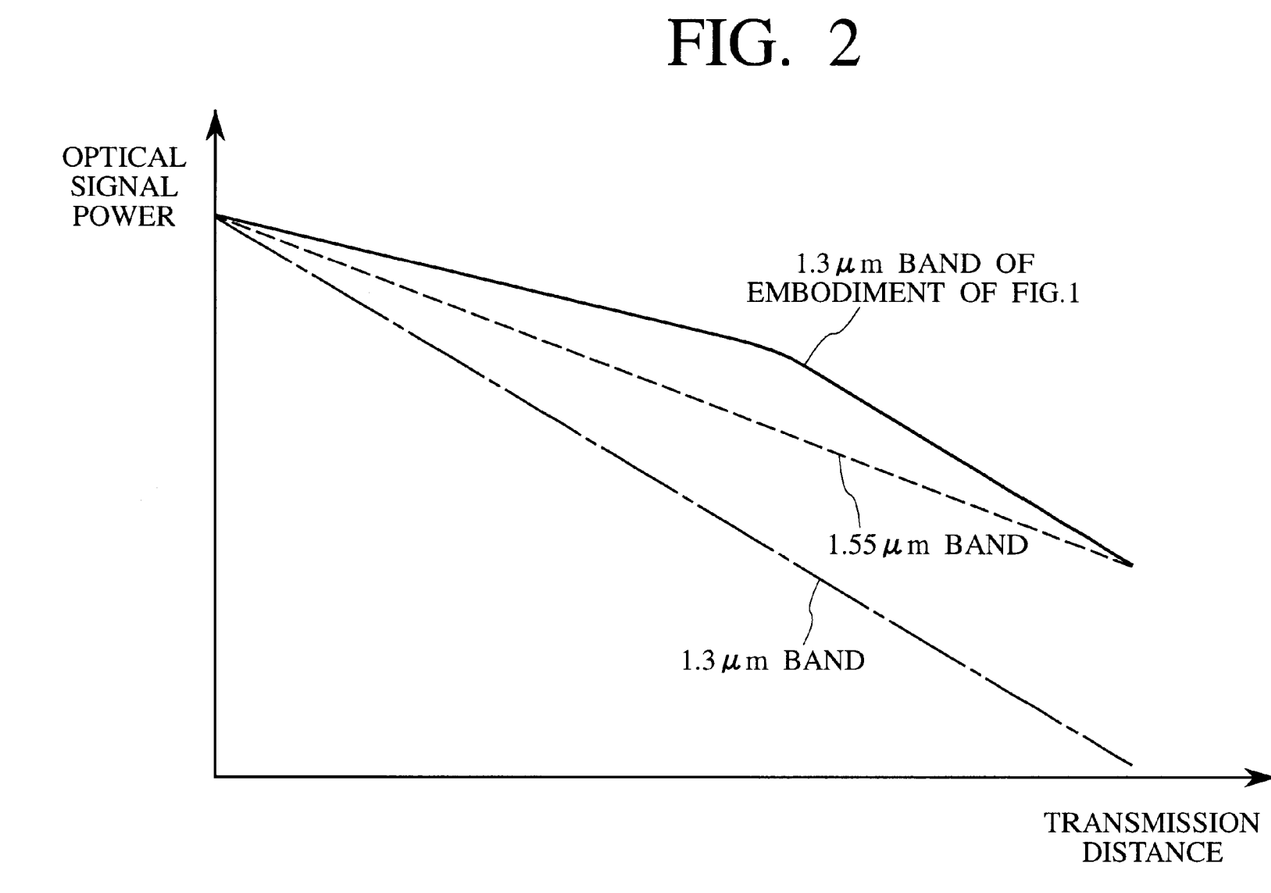
FIG. 2 is a graph showing the optical fiber transmission distance dependency of the optical signal power in the repeater of FIG. 1.

FIG. 2 is a graph showing the optical fiber transmission distance dependency of the optical signal power in this first embodiment of FIG. 1. In FIG. 2, a solid line indicates the distance dependency of the optical signal power for the 1.3 μm band in the optical wavelength division multiplexed signal amplifying repeater of FIG. 1, a dashed line indicates the distance dependency of the optical signal power for the 1.55 μm band, and a one dotted chain line indicates the distance dependency of the optical signal power for the 1.3 μm band in the case of having no Raman gain. As can be seen from FIG. 2, the optical signal power for the 1.3 μm band without the Raman gain as indicated by the one dotted chain line is considerably dissipated by the optical fiber compared with the optical signal power for the 1.55 μm band, but by giving the Raman gain as in this first embodiment, the loss of the optical signals of the 1.3 μm band due to the optical fiber can be compensated.

The Raman amplification by the pumping light source 7 for 1.3 μm band Raman amplification amplifies the optical signals using the induced Raman scattering generated in the transmission optical fiber, where the amplification effect is generated by entering lights with a wavelength shorter than the optical signals as the pumping lights into the optical fiber. In order to cause the Raman amplification effect in the 1.3 μm band, there is a need to use lights with a wavelength of approximately 1.2 μm as the pumping lights. The Raman gain is a gain obtained in the optical fiber of the transmission line due to the Raman Amplification.

Note that the transmission loss of the optical signals due to the optical fiber is approximately 0.3 dB/km in the 1.3 μm band and approximately 0.2 dB/km in the 1.55 μm band, so that there is a difference of 5 dB after the transmission over 50 km even when the powers of the Input optical signals at the optical fiber are the same. Consequently, by giving the Raman gain of 5 dB to the optical signals of the 1.3 μm band, the power of the optical signals of the 1.3 μm band can be made nearly equal to the power of the optical signals of the 1.55 μm band.

For the 1.55 μm band optical amplifier 3, the ordinary erbium doped optical fiber amplifier (EDFA) can be used. Also, as described above, it is possible to use the gain shifted EDFA in which the gain bandwidth of EDFA is shifted toward the long wavelength side, and these two types of EDFA can be combined and used as the two 1.55 μm band optical amplifiers 3 of FIG. 1.

The 1.3 μm band optical amplifier 4 can be a praseodymium doped optical fiber amplifier in which praseodymium is doped into the fiber, for example. An exemplary wavelength band of the 1.3 μm band optical amplifier 4 is from 1280 nm to 1310 nm, from 1530 nm to 1570 nm, or from 1580 nm to 1620 nm. Here, the wavelength band of the 1.3 μm band is narrow because the frequency is high so that it becomes narrower as the wavelength band even for the same 10 THz width.

Note that the gain bandwidth of the currently available optical amplifiers is at most several ten nm, so that two optical amplifiers 3 and two optical amplifiers 4 are used in this first embodiment in order to realize the gain bandwidth of 50 to 60 nm in the 1.3 μm band and the 1.55 μm band, respectively, but it is obviously possible to use just one optical amplifier 3 and one optical amplifier 4 if an optical amplifier which can cover the bandwidth of over 60 nm by itself is available. On the contrary, it is also possible use more than two optical amplifiers for each of the optical amplifiers 3 and the optical amplifiers 4. In such a case, it suffices for each optical amplifier to cover only a narrow bandwidth so that the power of the pumping light source to be used for the optical amplifiers 3 and the optical amplifiers 4 can be reduced.

The wavelength dispersion compensators 5 for compensating the wavelength dispersion in the transmission line are provided behind both the 1.55 μm band optical amplifiers 3 and the 1.3 μm band optical amplifiers 4, but the wavelength dispersion compensators 5 may be provided behind either the 1.55 μm band optical amplifiers 3 or the 1.3 μm band optical amplifiers 4, as will be described below. Also, the wavelength dispersion compensators 5 have a function for simultaneously compensating the wavelength dispersion slope as well as the wavelength dispersion of the transmission line, and can be provided in forms of fiber gratings, for example.

More specifically, the wavelength dispersion of the optical fiber is not constant but a function of wavelengths, and the optical fiber with the wavelength dispersion of 0 ps/km/nm at 1.3 μm has the wavelength dispersion of approximately 18 ps/km/nm at 1.55 μm, for example. The wavelength dispersion slope is the change in the wavelength dispersion divided by a difference in wavelengths, which has a size of approximately 0.05 to 0.1 ps/km/nm/nm.

The wavelength dispersion compensators 5 used in this first embodiment can compensate the fiber with the wavelength dispersion of 18 ps/km/nm and the wavelength dispersion slope of 0.05 ps/km/nm/nm for 1550 nm, for example. The transmission over 50 km through this fiber will cause the accumulated wavelength dispersion of 900 ps/nm for the signal wavelength of 1550 nm. Also, when the signal wavelength is 1560 nm, the wavelength dispersion increases to 18.5 ps/km/nm, so that the accumulated wavelength dispersion increases to 925 ps/nm for the transmission over the same 50 km through this fiber. Thus the wavelength dispersion compensator for compensating the wavelength dispersion and the wavelength dispersion slope simultaneously has the wavelength dispersion of −900 ps/nm for 1550 nm and the wavelength dispersion of −925 ps/nm for 1560 nm.

The ordinary wavelength dispersion compensator for compensating only the wavelength dispersion has the wavelength dispersion of −900 ps/nm for both 1550 nm and 1560 nm so that the accumulated dispersion cannot be compensated for 1560 nm. Consequently, by compensating both the wavelength dispersion and the wavelength dispersion slope simultaneously, it becomes possible to improve the transmission characteristics.

For the pumping light source 7 for 1.3 μm band Raman amplification, a semiconductor laser diode or a fiber Raman laser pumped by a semiconductor laser diode can be used, for example.

The optical coupler 8 couples the optical wavelength division multiplexed signals that are multiplexed into a single optical fiber from the optical signal multiplexer 6 and the pumping lights for 1.3 μm band Raman amplification from the pumping light source 7, and can be an optical fiber coupler or more suitably a WDM (Wavelength Division Multiplexed) coupler or a dielectric multi-layer film filter. In this first embodiment, the pumping lights for the Raman amplification and the optical wavelength division multiplexed signals will be propagated through the output optical fiber 9 in the same direction, so that the optical signals of the 1.3 μm band among the optical wavelength division multiplexed signals receive a large Raman gain in a vicinity of an output of this optical wavelength division multiplexed signal amplifying repeater but not much gain in a vicinity of a next optical wavelength division multiplexed signal amplifying repeater.

The optical signal demultiplexer 2 can be a demultiplexer formed by combining reflection of transmission of arrayed waveguide wavelength demultiplexers or dielectric multi-layer film filters in multiple stages. Also, this optical signal demultiplexer 2 should preferably have the cross-talk of 29 dB or more.

Figure 3:
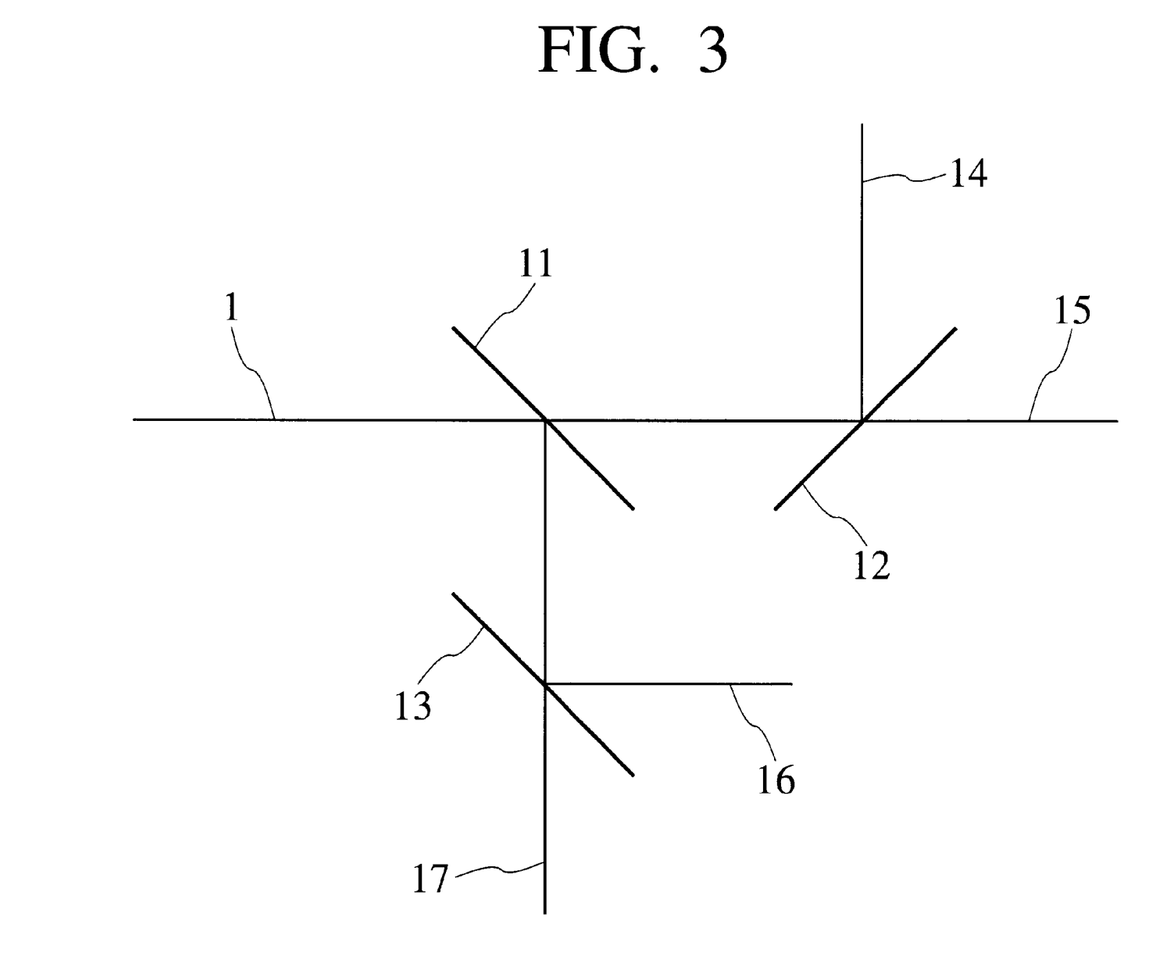
FIG. 3 is a diagram showing a configuration of an optical signal demultiplexer formed by dielectric multi-layer film filters that can be used in the repeater of FIG. 1.

FIG. 3 shows an exemplary configuration of the optical signal demultiplexer 2 formed by dielectric multi-layer film filters.

In FIG. 3, a filter 11 transmits optical signals of the 1.3 μm band among the optical wavelength division multiplexed signals from the input optical fiber 1 and reflects optical signals of optical signals of the 1.55 μm band, a filter 12 reflects optical signals with wavelengths shorter than 1.3 μm and transmits optical signals with wavelengths longer than 1.3 μm, a filter 13 reflects optical signals of wavelengths shorter than 1.57 μm and transmits optical signals of wavelengths longer than 1.57 μm, an output optical fiber 14 outputs optical wavelength division multiplexed signals of the 1.3 μm band with wavelengths shorter than 1.31 μm, an output optical fiber 15 outputs optical wavelength division multiplexed signals of the 1.3 μm band with wavelengths longer than 1.31 μm, an output optical fiber 16 outputs optical wavelength division multiplexed signals of the 1.55 μm band with wavelengths shorter than 1.57 μm, and an output optical fiber 17 outputs optical wavelength division multiplexed signals of the 1.55 μm band with wavelengths longer than 1.57 μm.

Using this optical signal demultiplexer 2 formed by dielectric multi-layer film filters, it is possible to demultiplexes optical wavelength division multiplexed signals entered from the input optical fiber 1 into (1) optical signals of the 1.3 µm band with wavelengths shorter than 1.31 µm, (2) optical signals of the 1.3 µm band with wavelengths longer than 1.31 µm, (3) optical signals of the 1.55 µm band with wavelengths shorter than 1.57 µm, and (4) optical signals of the 1.55 µm band with wavelengths longer than 1.57 µm, and enter these optical signals respectively into the optical amplifiers 3 and 4 of corresponding gain bandwidths.

Figure 4:
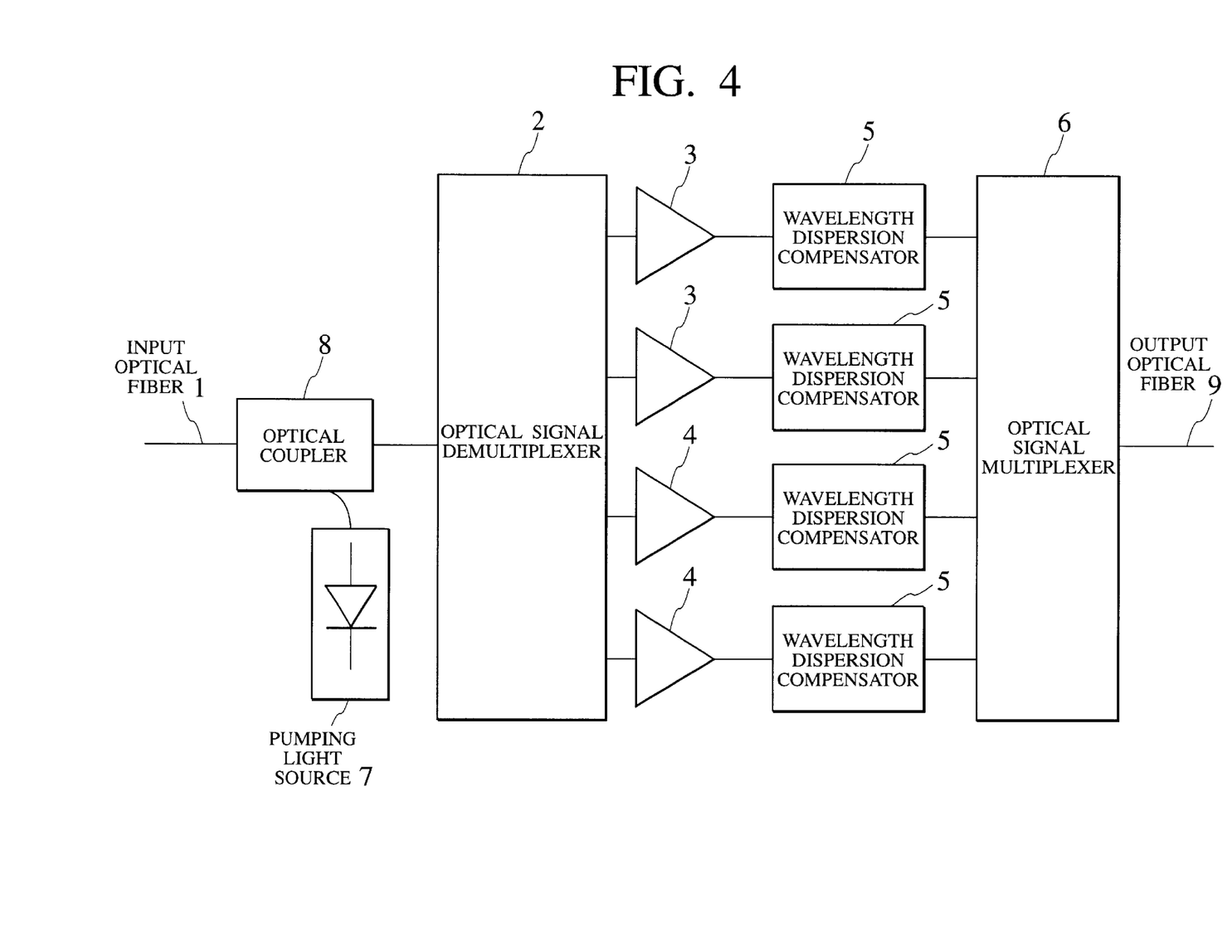
FIG. 4 is a block diagram showing a configuration of an optical wavelength division multiplexed signal amplifying repeater according to the second embodiment of the present invention.

FIG. 4 shows an exemplary configuration of an optical wavelength division multiplexed signal amplifying repeater according to the second embodiment of the present invention.

This optical wavelength division multiplexed signal amplifying repeater of FIG. 4 differs from that of FIG. 1 in that the optical coupler 8 is inserted into the input optical fiber 1 such that the pumping lights from the pumping light source for 1.3 µm band Raman amplification are propagated through the input optical fiber 1 in a direction opposite to that of the optical wavelength division multiplexed signals, while the rest of the configuration of FIG. 4 remains the same as that of FIG. 1.

Figure 5:
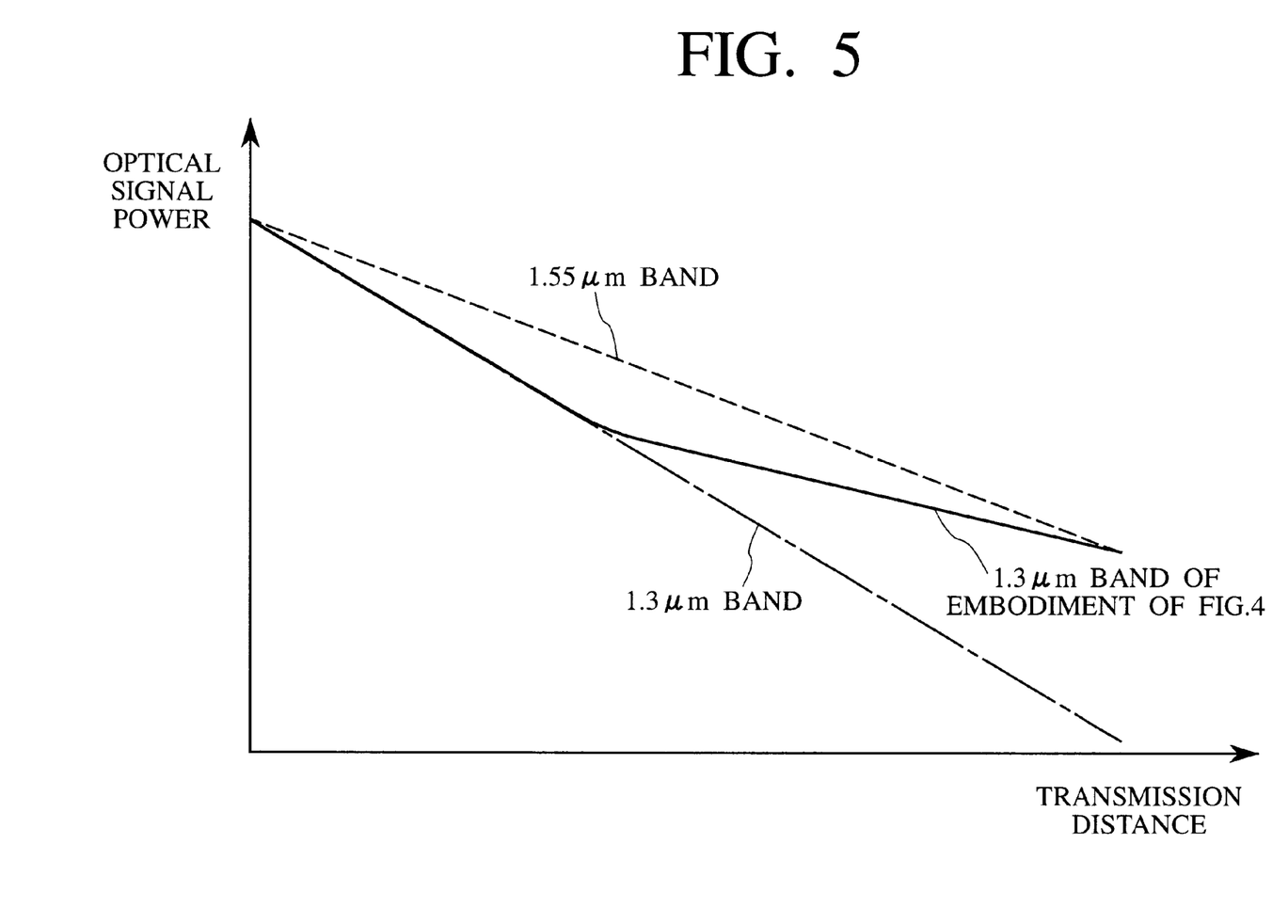
FIG. 5 is a graph showing the optical fiber transmission distance dependency of the optical signal power in the repeater of FIG. 4.

FIG. 5 is a graph showing the optical fiber transmission distance dependency of the optical signal power in this second embodiment of FIG. 4. In FIG. 5, a solid line indicates the distance dependency of the optical signal power for the 1.3 µm band in the optical wavelength division multiplexed signal amplifying repeater of FIG. 4, a dashed line indicates the distance dependency of the optical signal power for the 1.55 µm band, and a one dotted chain line indicates the distance dependency of the optical signal power for the 1.3 µm band in the case of having no Raman gain. As can be seen from FIG. 5, this second embodiment of FIG. 4 differs from the first embodiment of FIG. 1 in that the optical signal power of the 1.3 µm band decreases more quickly in a vicinity of the output of the repeater so that it becomes possible to reduce the optical signal degradation due to nonlinearity of the optical fiber with respect to the optical signals of the 1.3 µm band.

Figure 6:
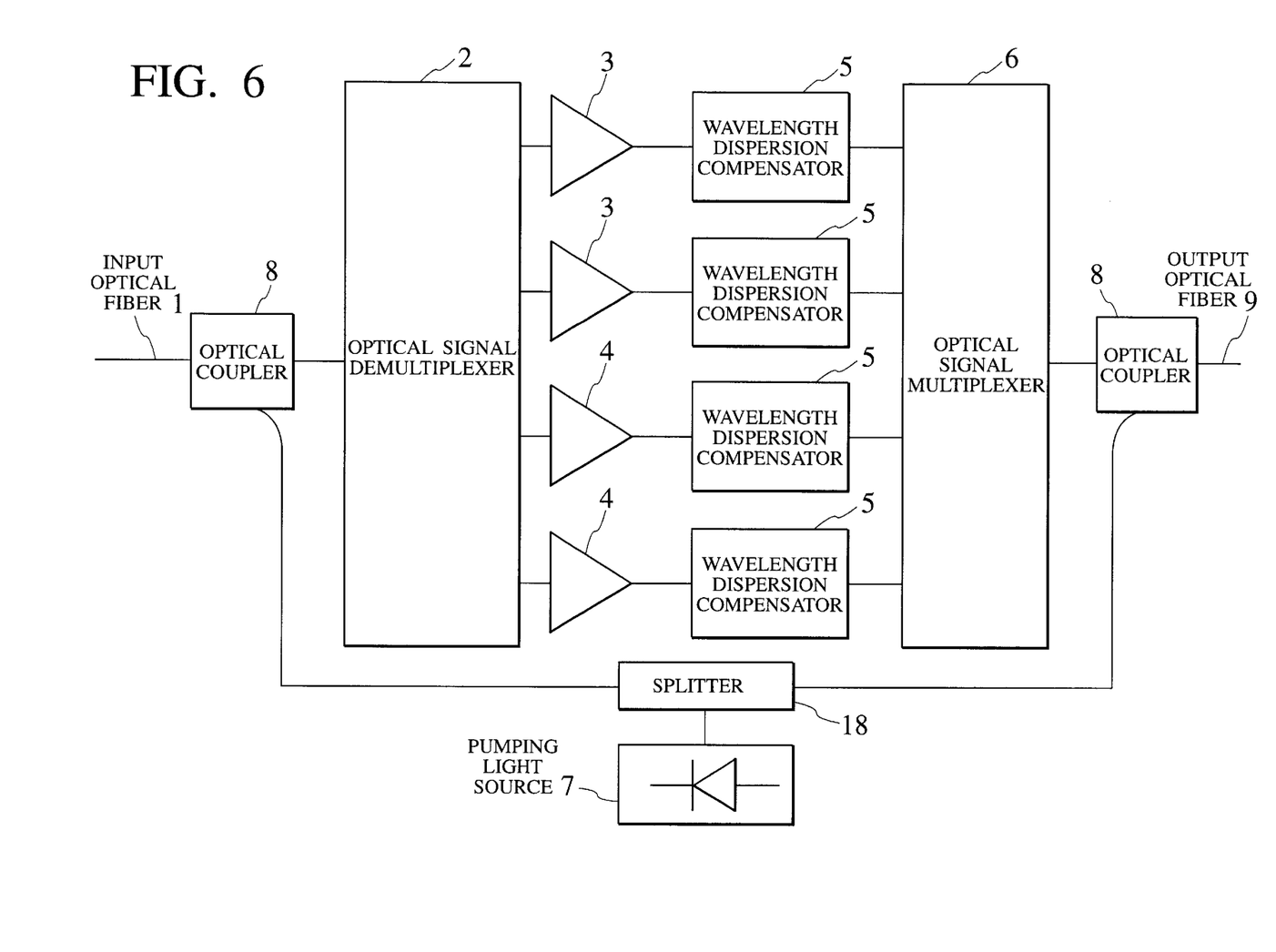
FIG. 6 is a block diagram showing a configuration of an optical wavelength division multiplexed signal amplifying repeater according to the third embodiment of the present invention.

FIG. 6 shows an exemplary configuration of an optical wavelength division multiplexed signal amplifying repeater according to the third embodiment of the present invention.

This optical wavelength division multiplexed signal amplifying repeater of FIG. 6 differs from that of FIG. 1 or FIG. 4 in that the optical coupler 8 is inserted at both input and output sides, that is, into both the input optical fiber 1 and the output optical fiber 9, in contrast to FIG. 1 or FIG. 4 where the optical coupler 8 is inserted at either the output side or the input side of the repeater, that is, into either the output optical fiber 9 or the input optical fiber 1, such that the pumping lights from the pumping light source 7 for Raman amplification propagate through the input optical fiber 1 and the output optical fiber 9 in both directions identical to and opposite to that of the optical wavelength division multiplexed signals. In addition, an optical splitter 18 for splitting the pumping lights from the pumping light source 7 for Raman amplification is provided, such that the pumping lights from the pumping light source 7 for Raman amplification are split into two and supplied to the two optical couplers 8 that are inserted into the input optical fiber 1 and the output optical fiber 9 where the pumping lights are coupled with the optical wavelength division multiplexed signals.

Figure 7:
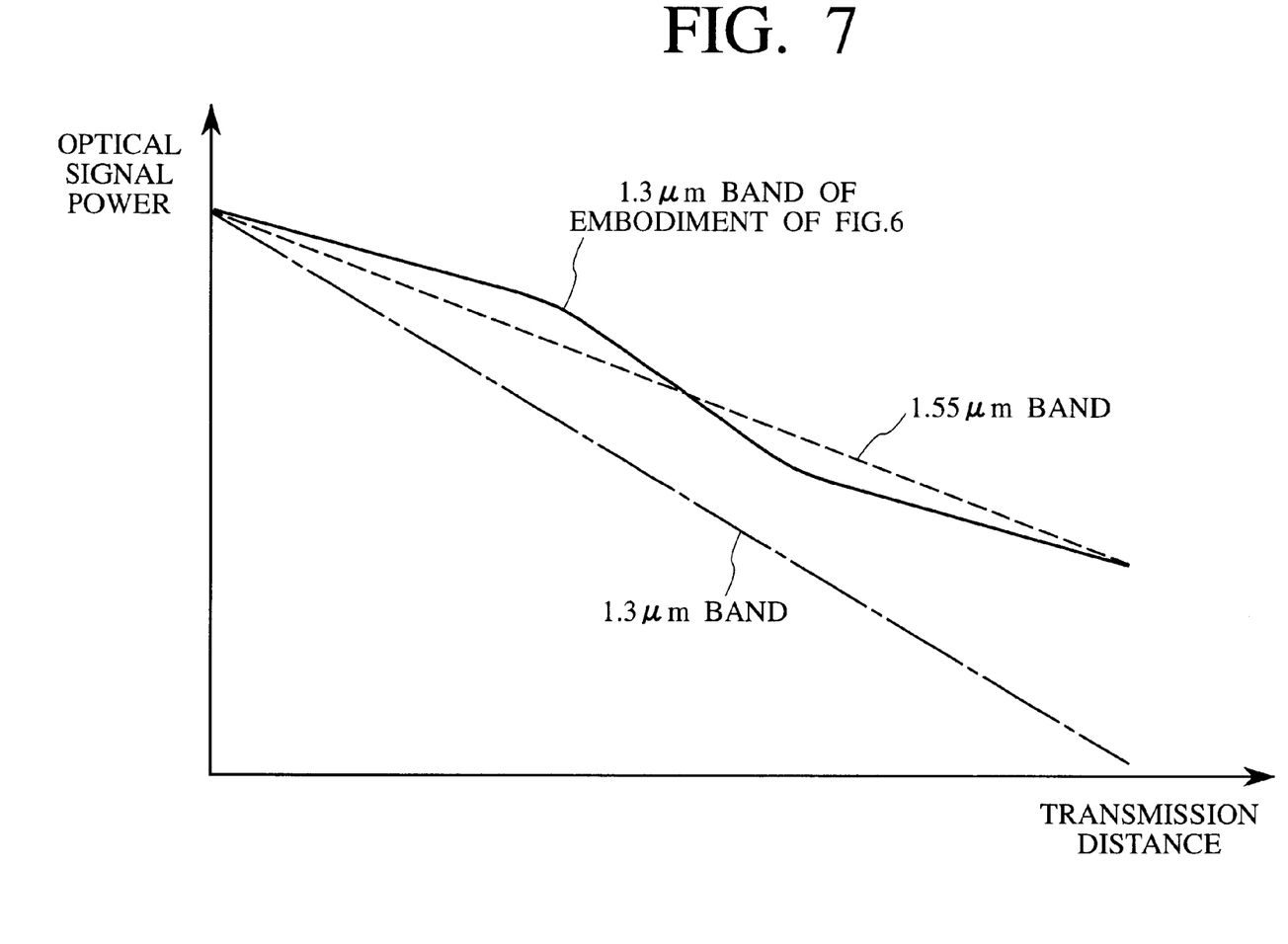
FIG. 7 is a graph showing the optical fiber transmission distance dependency of the optical signal power in the repeater of FIG. 6.

FIG. 7 is a graph showing the optical fiber transmission distance dependency of the optical signal power in this third embodiment of FIG. 6. In FIG. 7, a solid line indicates the distance dependency of the optical signal power for the 1.3 µm band in the optical wavelength division multiplexed signal amplifying repeater of FIG. 6, a dashed line indicates the distance dependency of the optical signal power for the 1.55 µm band, and a one dotted chain line indicates the distance dependency of the optical signal power for the 1.3 µm band in the case of having no Raman gain. As can be seen from FIG. 7, in this third embodiment of FIG. 6, the dropping of the optical signal power of the 1.3 µm band resembles the dropping of the optical signal power of the 1.55 µm band, so that it becomes easier to match the transmission characteristics of the 1.3 µm band and the 1.55 µm band.

Note that, in the third embodiment of FIG. 6, the output of a single pumping light source 7 is split into two by the optical splitter 18 and supplied to the two optical couplers 8 in order to save the number of pumping light source 7 for Raman amplification, but it is also obviously possible to use two pumping light sources 7 instead.

Figure 8:
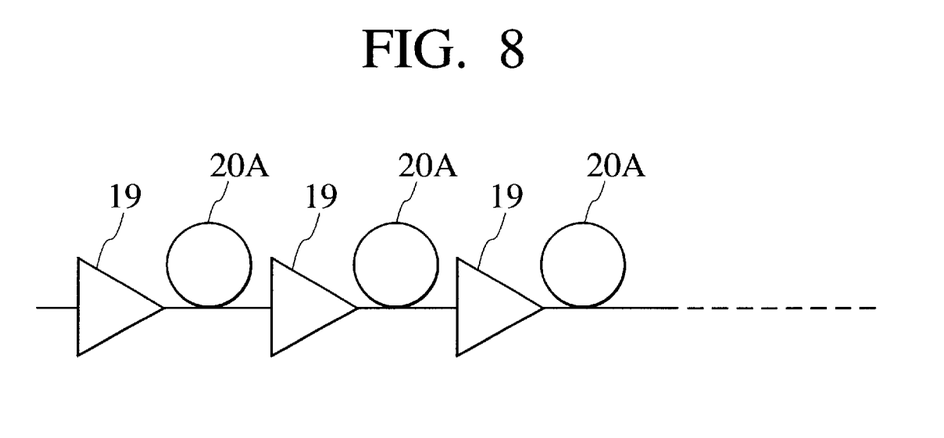
FIG. 8 is a diagram showing a configuration of an optical communication transmission line according to the fourth embodiment of the present invention.

FIG. 8 shows an exemplary configuration of an optical communication transmission line according to the fourth embodiment of the present invention. In FIG. 8, the optical wavelength division multiplexed signal amplifying repeaters 19 of a type shown in FIG. 1, FIG. 4 or FIG. 6 are connected through transmission optical fibers 20A.

Figure 9:
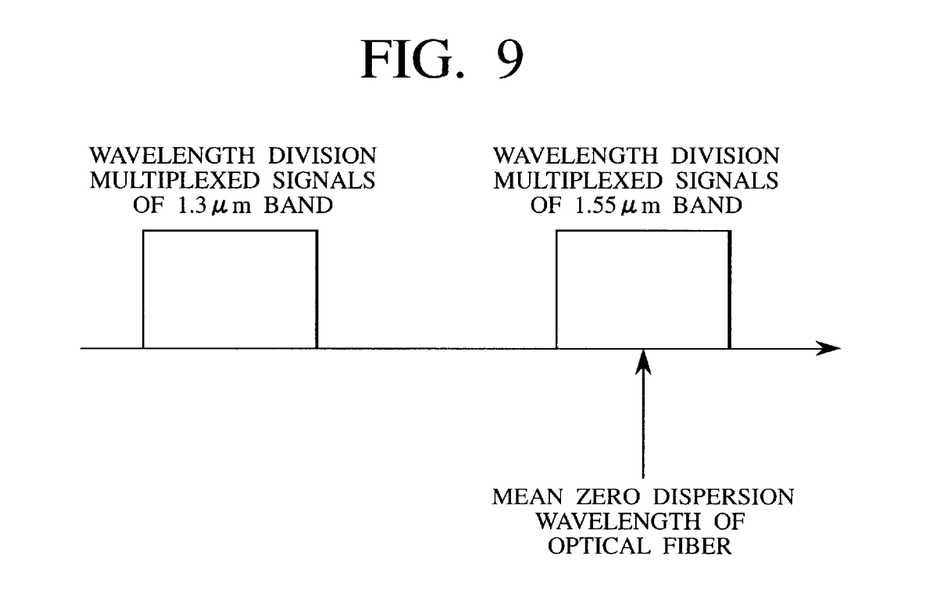
FIG. 9 is a diagram showing a relationship between optical wavelength division multiplexed signals and a mean zero dispersion wavelength of transmission optical fiber in the optical communication transmission line of FIG. 8.

In the optical communication transmission line of this fourth embodiment of FIG. 8, the mean zero dispersion wavelength of the transmission optical fibers 20A is set to the 1.55 µm band. The relationship between the optical wavelength division multiplexed signals and the mean zero dispersion wavelength of the transmission optical fibers 20A is as shown in FIG. 9. When this setting is used, the wavelength dispersion compensators 5 provided behind the 1.55 µm band optical amplifiers 3 in the configuration of FIG. 1, FIG. 4 or FIG. 6 become unnecessary.

Namely, when the mean zero dispersion wavelength of the optical fibers coincides with the signal wavelength band, the accumulated dispersion value does not grow so large even after the long distance transmission so that there is no need to compensate the wavelength dispersion using the wavelength dispersion compensators 5 provided within each repeater, and therefore the wavelength dispersion compensators 5 become unnecessary. When the mean zero dispersion wavelength is 1.55 µm and the signal wavelength is 1.55 µm, the accumulated wavelength dispersion becomes zero so that there is no need to carry out the wavelength dispersion compensation at each repeater.

In this fourth embodiment, the wavelength separation of the optical wavelength division multiplexed signals to be transmitted through the optical communication transmission line is set as an equal channel spacing for the 1.3 µm band and as an unequal channel spacing for the 1.55 µm band. Namely, in relation to the zero dispersion wavelength of the transmission optical fibers, the unequal channel spacing is used in order to suppress the four wave mixing that occurs in the bandwidth near the zero dispersion wavelength. The use of the unequal channel spacing in the case where the signal wavelength bandwidth and the zero dispersion wavelength of the transmission optical fibers are close to each other is well known. Note that, for the wavelength separation in the case of equal channel spacing, it is recommended to use 100 GHz as a reference separation by ITU, for example.

Figure 10:
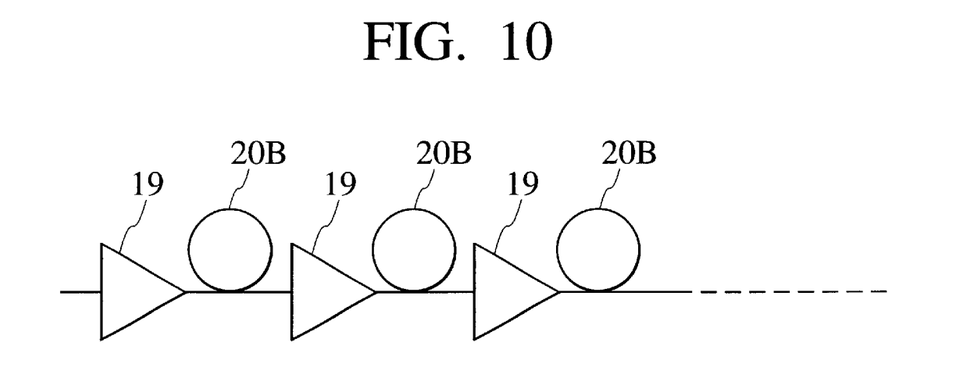
FIG. 10 is a diagram showing a configuration of an optical communication transmission line according to the fifth embodiment of the present invention.

FIG. 10 shows an exemplary configuration of an optical communication transmission line according to the fifth embodiment of the present invention. In FIG. 10, the optical wavelength division multiplexed signal amplifying repeaters 19 of a type shown in FIG. 1, FIG. 4 or FIG. 6 are connected through transmission optical fibers 20B.

Figure 11:
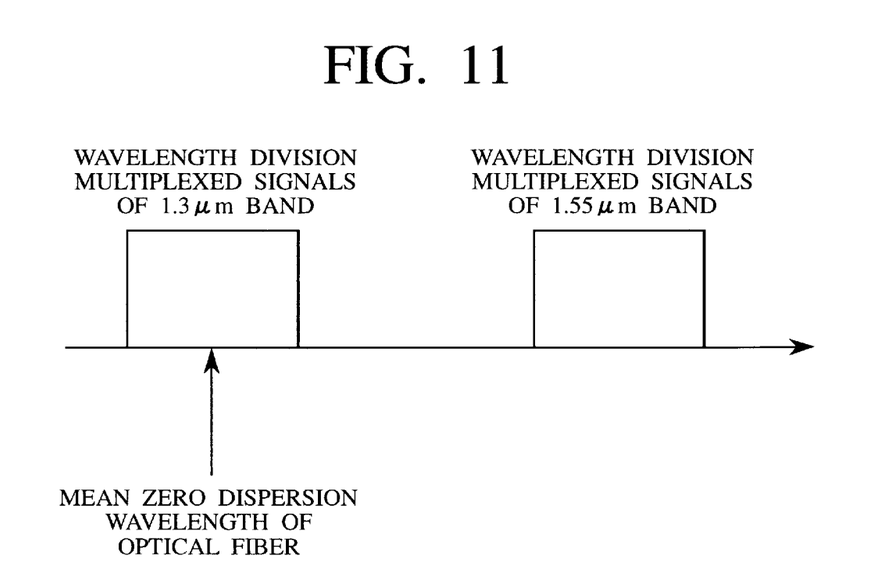
FIG. 11 is a diagram showing a relationship between optical wavelength division multiplexed signals and a mean zero dispersion wavelength of transmission optical fiber in the optical communication transmission line of FIG. 10.

In the optical communication transmission line of this fifth embodiment of FIG. 10, the mean zero dispersion wavelength of the transmission optical fibers 20B is set to the 1.3 µm band. The relationship between the optical wavelength division multiplexed signals and the mean zero dispersion wavelength of the transmission optical fibers 20B is as shown in FIG. 11. When this setting is used, the wavelength dispersion compensators 5 provided behind the 1.3 µm band optical amplifiers 4 in the configuration of FIG. 1, FIG. 4 or FIG. 6 become unnecessary.

Figure 12:
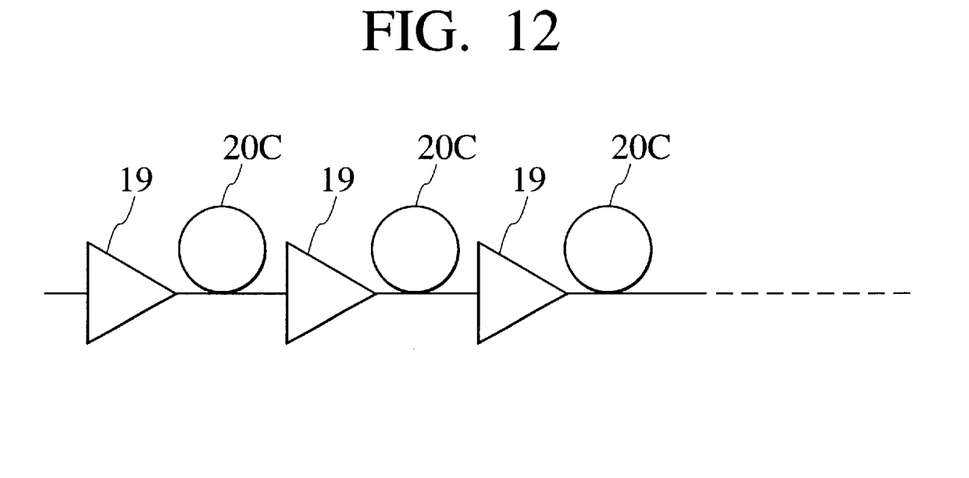
FIG. 12 is a diagram showing a configuration of an optical communication transmission line according to the sixth embodiment of the present invention.

FIG. 12 shows an exemplary configuration of an optical communication transmission line according to the sixth embodiment of the present invention. In FIG. 12, the optical wavelength division multiplexed signal amplifying repeaters 19 of a type shown in FIG. 1, FIG. 4 or FIG. 6 are connected through transmission optical fibers 20C.

Figure 13:
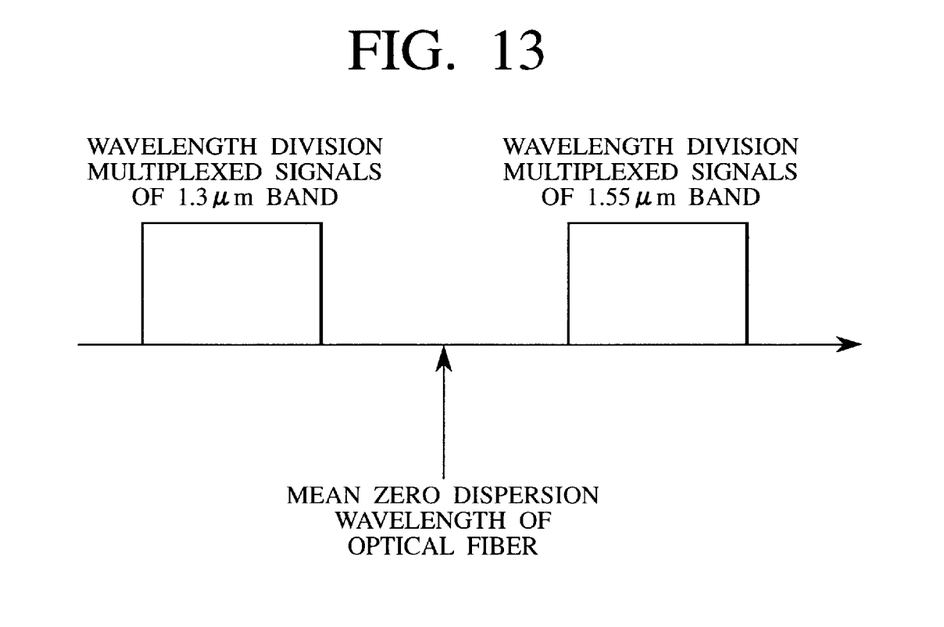
FIG. 13 is a diagram showing a relationship between optical wavelength division multiplexed signals and a mean zero dispersion wavelength of transmission optical fiber in the optical communication transmission line of FIG. 12.

In the optical communication transmission line of this sixth embodiment of FIG. 12, the mean zero dispersion wavelength of the transmission optical fibers 20C is set to be in a middle of the 1.3 µm band and the 1.55 µm band. The relationship between the optical wavelength division multiplexed signals and the mean zero dispersion wavelength of the transmission optical fibers 20C is as shown in FIG. 13. When this setting is used, the wavelength dispersion compensators 5 provided behind the 1.3 µm band optical amplifiers 4 in the configuration of FIG. 1, FIG. 4 or FIG. 6 will have a large anomalous dispersion, while the wavelength dispersion compensators 5 provided behind the 1.55 µm band optical amplifiers 3 in the configuration of FIG. 1, FIG. 4 or FIG. 6 will have a large normal dispersion.

Figure 14:
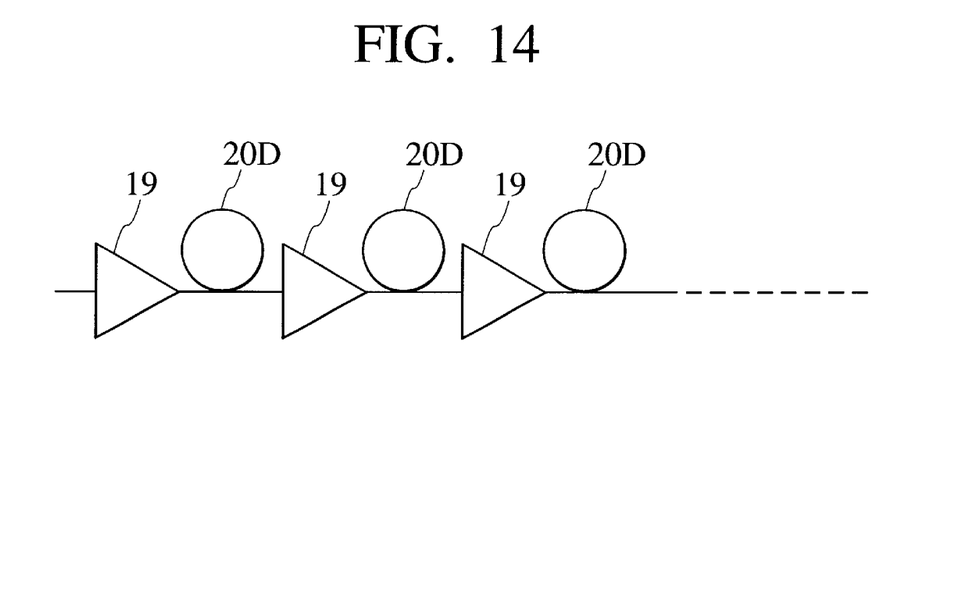
FIG. 14 is a diagram showing a configuration of an optical communication transmission line according to the seventh embodiment of the present invention.

FIG. 14 shows an exemplary configuration of an optical communication transmission line according to the seventh embodiment of the present invention. In FIG. 14, the optical wavelength division multiplexed signal amplifying repeaters 19 of a type shown in FIG. 1, FIG. 4 or FIG. 6 are connected through transmission optical fibers 20D.

Figure 15:
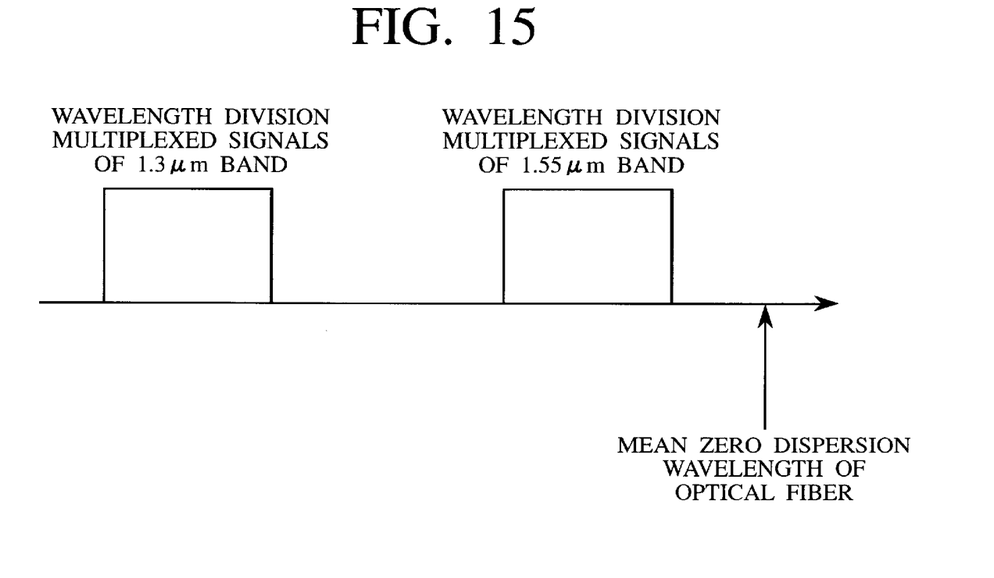
FIG. 15 is a diagram showing a relationship between optical wavelength division multiplexed signals and a mean zero dispersion wavelength of transmission optical fiber in the optical communication transmission line of FIG. 14.

In the optical communication transmission line of this seventh embodiment of FIG. 14, the mean zero dispersion wavelength of the transmission optical fibers 20D is set to be a longer wavelength than the 1.55 µm band. The relationship between the optical wavelength division multiplexed signals and the mean zero dispersion wavelength of the transmission optical fibers 20D is as shown in FIG. 15. When this setting is used, the wavelength dispersion compensators 5 provided behind the optical amplifiers 3 and 4 in the configuration of FIG. 1, FIG. 4 or FIG. 6 will have a large anomalous dispersion.

Figure 16:
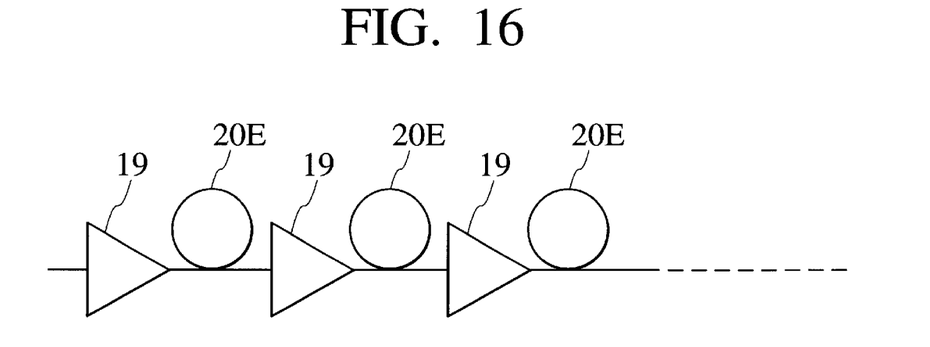
FIG. 16 is a diagram showing a configuration of an optical communication transmission line according to the eighth embodiment of the present invention.

FIG. 16 shows an exemplary configuration of an optical communication transmission line according to the eighth embodiment of the present invention. In FIG. 16, the optical wavelength division multiplexed signal amplifying repeaters 19 of a type shown in FIG. 1, FIG. 4 or FIG. 6 are connected through transmission optical fibers 20E.

Figure 17:
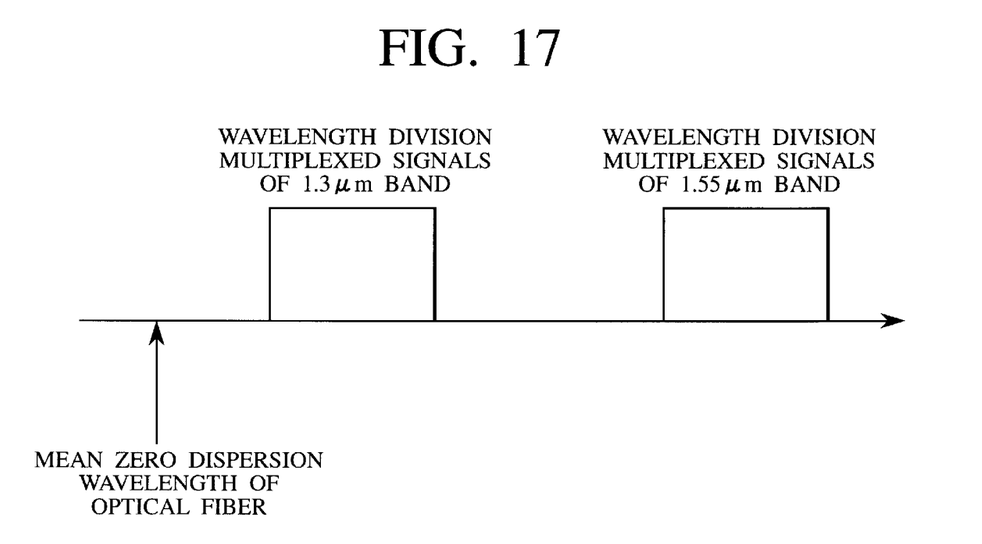
FIG. 17 is a diagram showing a relationship between optical wavelength division multiplexed signals and a mean zero dispersion wavelength of transmission optical fiber in the optical communication transmission line of FIG. 16.

In the optical communication transmission line of this eighth embodiment of FIG. 16, the mean zero dispersion wavelength of the transmission optical fibers 20E is set to be a shorter wavelength than the 1.3 µm band. The relationship between the optical wavelength division multiplexed signals and the mean zero dispersion wavelength of the transmission optical fibers 20E is as shown in FIG. 17. When this setting is used, the wavelength dispersion compensators 5 provided behind the optical amplifiers 3 and 4 in the configuration of FIG. 1, FIG. 4 or FIG. 6 will have a large normal dispersion.

As described, according to the present invention, the optical signals of the 1.3 µm band and the optical signals of the 1.55 µm band are both amplified while the Raman amplification is caused for the optical signals of the 1.3 µm band by coupling the optical wavelength division multiplexed signals with the pumping lights for Raman amplification from the pumping light source, so that the loss of the optical fibers in the 1.3 µm band which is larger than that in the 1.55 µm band can be compensated by the Raman amplification, so that it becomes possible to realize the optical communication transmission line with the considerably widened transmission bandwidth and therefore it becomes possible to realize the optical communications with a very large capacity of several Tbit/s.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An optical wavelength division multiplexed signal amplifying repeater, comprising:
an optical amplification unit for amplifying optical signals of both 1.3 µm and 1.55 µm band in optical wavelength division multiplexed signals entered from an input optical fiber;
a pumping light source for providing pumping lights capable of causing Raman amplification in the 1.3 µm band; and
an optical coupling unit for coupling the pumping lights from the pumping light source with the optical wavelength division multiplexed signals at either one or both of an input and an output of the optical amplification unit, so as to cause the Raman amplification for the optical signals of the 1.3 µm band, such that the optical wavelength division multiplexed signals in which the optical signals of the 1.3 µm band and the 1.55 µm band are amplified by the optical amplification unit and the Raman amplification is caused for the optical signals of the 1.3 µm band by the pumping lights that are coupled with the wavelength division multiplexed signals by the optical coupling unit are outputted to an output optical fiber.

2. The optical wavelength division multiplexed signal amplifying repeater of claim 1, wherein the optical amplification unit includes a first optical amplification unit having the 1.3 µm band as a gain bandwidth and a second optical amplification unit having the 1.55 µm band as a gain bandwidth.

3. The optical wavelength division multiplexed signal amplifying repeater of claim 2, further comprising:
an optical demultiplexer for demultiplexing the optical wavelength division multiplexed signals into the optical signals of the 1.3 µm band and the 1.55 µm band and supplying the optical signals of the 1.3 µm band and the 1.55 µm band to the first optical amplification unit and the second optical amplification unit respectively; and
an optical multiplexer for multiplexing the optical signals of the 1.3 µm band and the 1.55 µm band amplified by the first optical amplification unit and the second optical amplification unit.

4. The optical wavelength division multiplexed signal amplifying repeater of claim 3, wherein each of the optical demultiplexer and the optical multiplexer is formed by an arrayed optical waveguide.

5. The optical wavelength division multiplexed signal amplifying repeater of claim 2, further comprising a wavelength dispersion compensation unit for compensating wavelength dispersion of a transmission line, which is provided behind either one or both of the first optical amplification unit and the second optical amplification unit.

6. The optical wavelength division multiplexed signal amplifying repeater of claim 5, wherein the wavelength dispersion compensation unit compensates the wavelength dispersion and wavelength dispersion slope of the transmission line simultaneously.

7. The optical wavelength division multiplexed signal amplifying repeater of claim 5, wherein the wavelength dispersion compensation unit is formed by a fiber grating.

8. The optical wavelength division multiplexed signal amplifying repeater of claim 3, wherein each of the optical demultiplexer and the optical multiplexer is formed by dielectric multi-layer film filters in which transmission and reflection are combined in multiple stages.

9. The optical wavelength division multiplexed signal amplifying repeater of claim 3, wherein each of the optical demultiplexer and the optical multiplexer has a cross-talk of 29 dB or more.

10. The optical wavelength division multiplexed signal amplifying repeater of claim 1, wherein the pumping light source is formed by a semiconductor laser diode.

11. The optical wavelength division multiplexed signal amplifying repeater of claim 1, wherein the pumping light source is formed by a fiber Raman laser pumped by a semiconductor laser diode.

12. The optical wavelength division multiplexed signal amplifying repeater of claim 1, wherein the optical coupling unit couples the pumping lights with the optical wavelength division multiplexed signals at either one or both of the input optical fiber and the output optical fiber.

13. The optical wavelength division multiplexed signal amplifying repeater of claim 1, wherein the optical coupling unit is formed by a wavelength division multiplexed coupler.

14. The optical wavelength division multiplexed signal amplifying repeater of claim 1, wherein the optical coupling unit is formed by a dielectric multi-layer film filter.

15. An optical communication transmission line, comprising:

a plurality of optical wavelength division multiplexed signal amplifying repeaters, each having: an optical amplification unit for amplifying signals for both 1.3 $\mu$m band and 1.55 $\mu$m band in optical wavelength division multiplexed signals entered from an input optical fiber; a pumping light source for providing pumping lights capable of causing Raman amplification in the 1.3 $\mu$m band; and an optical coupling unit for coupling the pumping lights from the pumping light source with the optical wavelength division multiplexed signals at either one or both of an input and an output of the optical amplification unit, so as to cause the Raman amplification for the optical signals of the 1.3 $\mu$m band, such that the optical wavelength division multiplexed signals in which the optical signals of the 1.3 $\mu$m band and the 1.55 $\mu$m band are amplified by the optical amplification unit and the Raman amplification is caused for the optical signals of the 1.3 $\mu$m band by the pumping lights that are coupled with the wavelength division multiplexed signals by the optical coupling unit are outputted to an output optical fiber; and optical fibers connecting the optical wavelength division multiplexed signal amplifying repeaters in series.

16. The optical communication transmission line of claim 15, wherein the optical fibers have a mean zero dispersion wavelength set to the 1.55 $\mu$m band.

17. The optical communication transmission line of claim 16, wherein the optical fibers transmit the optical wavelength division multiplexed signals in which optical signals of the 1.3 $\mu$m band have an equal wavelength separation and optical signals of the 1.55 $\mu$m band have an unequal wavelength separation.

18. The optical communication transmission line of claim 16, wherein each optical wavelength division multiplexed signal amplifying repeater has the optical amplification unit including a first optical amplification unit having the 1.3 $\mu$m band as a gain bandwidth and a second optical amplification unit having the 1.55 $\mu$m band as a gain bandwidth, and a wavelength dispersion compensation unit for compensating wavelength dispersion of the optical communication transmission line, which is provided behind the first optical amplification unit.

19. The optical communication transmission line of claim 15, wherein the optical fibers have a mean zero dispersion wavelength set to the 1.3 $\mu$m band.

20. The optical communication transmission line of claim 19, wherein the optical fibers transmit the optical wavelength division multiplexed signals in which optical signals of the 1.55 $\mu$m band have a regular wavelength separation and optical signals of the 1.3 $\mu$m band have an unequal wavelength separation.

21. The optical communication transmission line of claim 19, wherein each optical wavelength division multiplexed signal amplifying repeater has the optical amplification unit including a first optical amplification unit having the 1.3 $\mu$m band as a gain bandwidth and a second optical amplification unit having the 1.55 $\mu$m band as a gain bandwidth, and a wavelength dispersion compensation unit for compensating wavelength dispersion of the optical communication transmission line, which is provided behind the second optical amplification unit.

22. The optical communication transmission line of claim 15, wherein the optical fibers have a mean zero dispersion wavelength set to a wavelength longer than the 1.55 $\mu$m band.

23. The optical communication transmission line of claim 15, wherein the optical fibers have a mean zero dispersion wavelength set to a wavelength shorter than the 1.3 $\mu$m band.

24. The optical communication transmission line of claim 15, wherein the optical fibers have a mean zero dispersion wavelength set to a wavelength between the 1.3 $\mu$m band and the 1.55 $\mu$m band.

\* \* \* \* \*